United States Patent

Daly et al.

(10) Patent No.: US 7,266,077 B1
(45) Date of Patent: Sep. 4, 2007

(54) SERIAL DIGITAL COMMUNICATION SYSTEM AND METHOD

(75) Inventors: Michael P. Daly, Wicklow (IE); David Thomson, Fremont, CA (US)

(73) Assignee: Analog Devices, Inc., Norwood, MA (US)

( * ) Notice: Subject to any disclaimer, the term of this patent is extended or adjusted under 35 U.S.C. 154(b) by 824 days.

(21) Appl. No.: 10/776,944

(22) Filed: Feb. 10, 2004

Related U.S. Application Data

(60) Provisional application No. 60/540,206, filed on Jan. 28, 2004.

(51) Int. Cl.
*H04J 7/00* (2006.01)
(52) U.S. Cl. .................. 370/212; 375/238; 332/109
(58) Field of Classification Search ............ None
See application file for complete search history.

(56) References Cited

U.S. PATENT DOCUMENTS

| | | | | |
|---|---|---|---|---|
| 4,502,024 A * | 2/1985 | Nishikawa et al. | ......... | 332/109 |
| 5,459,751 A * | 10/1995 | Okamoto | ............ | 375/354 |
| 5,940,021 A * | 8/1999 | Ahn | ............ | 341/155 |
| 6,018,513 A * | 1/2000 | Okamoto et al. | ............ | 370/212 |
| 6,038,255 A * | 3/2000 | Palmer et al. | ............ | 375/238 |
| 6,421,382 B1 * | 7/2002 | Hayakawa | ............ | 375/238 |
| 6,473,457 B1 * | 10/2002 | Pascual et al. | ............ | 375/238 |
| 6,526,094 B1 * | 2/2003 | Watanabe | ............ | 375/238 |
| 6,532,260 B2 * | 3/2003 | Oi | ............ | 375/238 |
| 7,003,032 B2 * | 2/2006 | Klemish et al. | ............ | 375/238 |
| 7,184,480 B1 * | 2/2007 | Gheorghiu | ............ | 375/238 |
| 2002/0071484 A1 * | 6/2002 | Spichale | ............ | 375/238 |
| 2005/0088962 A1 * | 4/2005 | Toy et al. | ............ | 370/212 |

* cited by examiner

*Primary Examiner*—Bob A. Phunkulh
(74) *Attorney, Agent, or Firm*—Koppel, Patrick, Heybl & Dawson

(57) ABSTRACT

A serial digital communication system includes a master device and a plurality of slave devices connected serially between the master device's output and input—thereby forming a closed chain. Each slave device transmits a predetermined number of PWM pulses to the device following it in the chain upon receipt of an end-of-transmission (EOT) signal from the device preceding it in the chain, and transmits an EOT signal when the transmission of its PWM pulses is completed. The master device transmits an EOT signal to initiate the transmission of PWM pulses from each slave device. Each slave device passively buffers PWM pulses received from the preceding device, such that PWM pulses are transmitted in one direction sequentially to the input of the master device via the intervening slave device.

22 Claims, 4 Drawing Sheets

SERIAL DIGITAL COMMUNICATION SYSTEM AND METHOD

This application claims the benefit of provisional patent application No. 60/540,206 to Daly et al., filed Jan. 28, 2004.

BACKGROUND OF THE INVENTION

1. Field of the Invention

This invention relates to the field of digital communication systems, and particularly to protocols for serial digital communication systems.

2. Description of the Related Art

Many systems exist for transferring data between peripheral devices and a master device such as a microprocessor. Such systems typically employ a multiple-wire bus structure to which each device is connected, with data transferred between devices either serially or in parallel. To retrieve data from a particular device on the bus, the device must first be addressed or enabled in some fashion.

One such system is known as the serial peripheral interface (SPI). The SPI is a full duplex, four wire synchronous serial interface based on a master/slave relationship. However, the SPI requires that each interconnected device have a pin by which the device is enabled prior to transferring data; this increases processing overhead and the system's I/O requirements. The system also requires 4 wires, which may consume more area than is desired.

SUMMARY OF THE INVENTION

A system and method for effecting serial digital communication is presented, which overcomes the problems noted above. The present system requires just one wire, and none of the communicating devices requires an address.

The new system includes a master device having an input and an output, with a plurality of slave devices connected serially between the master device's output and input—thereby forming a closed chain. The system's protocol requires that each slave device transmit a predetermined number of pulse-width-modulated (PWM) pulses to the device immediately following it in the chain upon receipt of an end-of-transmission (EOT) signal from the device immediately preceding it in the chain, and to transmit an EOT signal when the transmission of its predetermined number of PWM pulses is completed. The master device is arranged to transmit an EOT signal to initiate the transmission of PWM pulses from each slave device.

Each of the slave devices passively buffers PWM pulses received from the device immediately preceding it in the chain, such that each device's PWM pulses are transmitted in one direction sequentially to the input of the master device via the intervening slave devices. Thus, upon transmitting the EOT signal, the master device receives a continuous stream of PWM pulses followed by a single EOT signal. In this manner, each device communicates in turn back to the master device, with each PWM pulse uniquely identified with its source device by its position in the incoming data stream.

In a preferred embodiment, each device responds to an EOT signal by transmitting a single PWM pulse, whose information content is coded in the ratio of the pulse's "high" time to its "low" time. The EOT signal is preferably a single narrow high pulse, whose total high time is less than the minimum permitted PWM pulse high time, and thus can be easily distinguished from the information passing through the chain.

An alternative protocol requires the slave devices to transmit a "start-of-transmission" (SOT) signal prior to sending its PWM pulse(s). The SOT signals would be buffered by each slave device, and would serve to separate each device's PWM pulses.

Further features and advantages of the invention will be apparent to those skilled in the art from the following detailed description, taken together with the accompanying drawings.

DETAILED DESCRIPTION OF THE INVENTION

Figure 1:
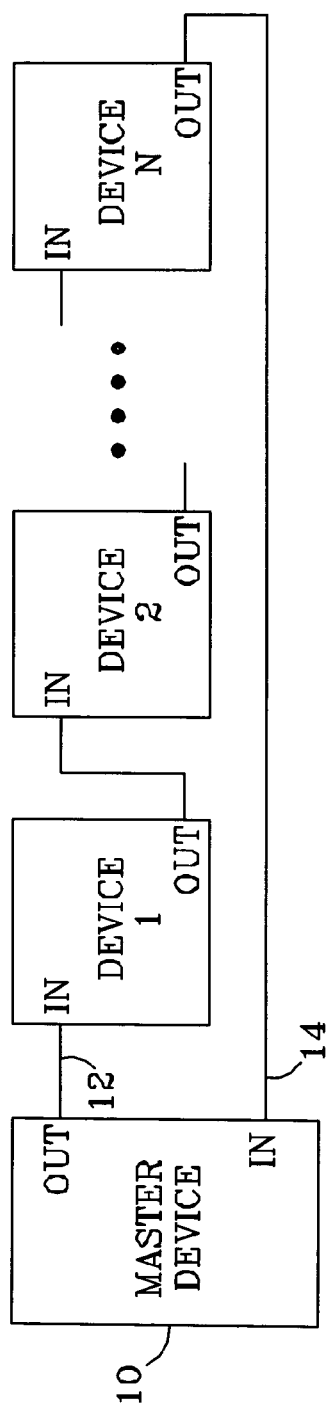
FIG. 1 is a block diagram of a serial digital communication system per the present invention.

A serial digital communication system per the present invention is shown in FIG. 1. A master device 10, such as a microprocessor or microcontroller, has an output terminal 12 and an input terminal 14. A plurality of slave devices (DEVICE 1, DEVICE 2, . . . , DEVICE N) are serially connected between the master device's output and input, thereby forming a closed chain. Each slave device has an input terminal (IN) and an output terminal (OUT), with each input terminal connected to the output of the device preceding it in the chain, and each output terminal connected to the input of the following device.

The system is arranged to convey information via pulse-width-modulated (PWM) pulses, wherein information is coded in the ratio of the pulse's high time to its low time. Either analog or digital values can be encoded with the PWM pulse. For example, a temperature value could be encoded into a single PWM pulse, with the ratio of the pulse's high time to low time being proportional to the temperature. For digital encoding, one PWM duty ratio can be designated as a logic "0", with another duty ratio designated as a logic "1".

In a preferred embodiment, the system's protocol calls for each of the slave devices to transmit a predetermined number of PWM pulses to the device immediately following it in the chain upon receipt of an "end-of-transmission" (EOT) signal from the device immediately preceding it in the chain, and to transmit an EOT signal when the transmission of its predetermined number of PWM pulses is completed.

Transmission of PWM pulses from each device is initiated by master device 10, which transmits an EOT signal to the first device in the chain. Each slave device is arranged to passively buffer PWM pulses received from the slave device immediately preceding it in the chain. When so arranged, each device's PWM pulses are transmitted in one direction sequentially to the input of master device 10 via the intervening slave devices, such that, upon transmitting an EOT signal, master device 10 receives a continuous stream of PWM pulses followed by a single EOT signal.

An EOT signal comprises one or more pulses having characteristics which are clearly distinguishable from those of the PWM pulses. Preferably, the PWM pulses have a defined minimum pulse "high" time, and each EOT signal is a single, high-going pulse having a pulse width which is less than the minimum pulse "high" time. Note, however, that there are numerous acceptable methods in which an EOT signal might be distinguished from the PWM pulses.

Figure 2:
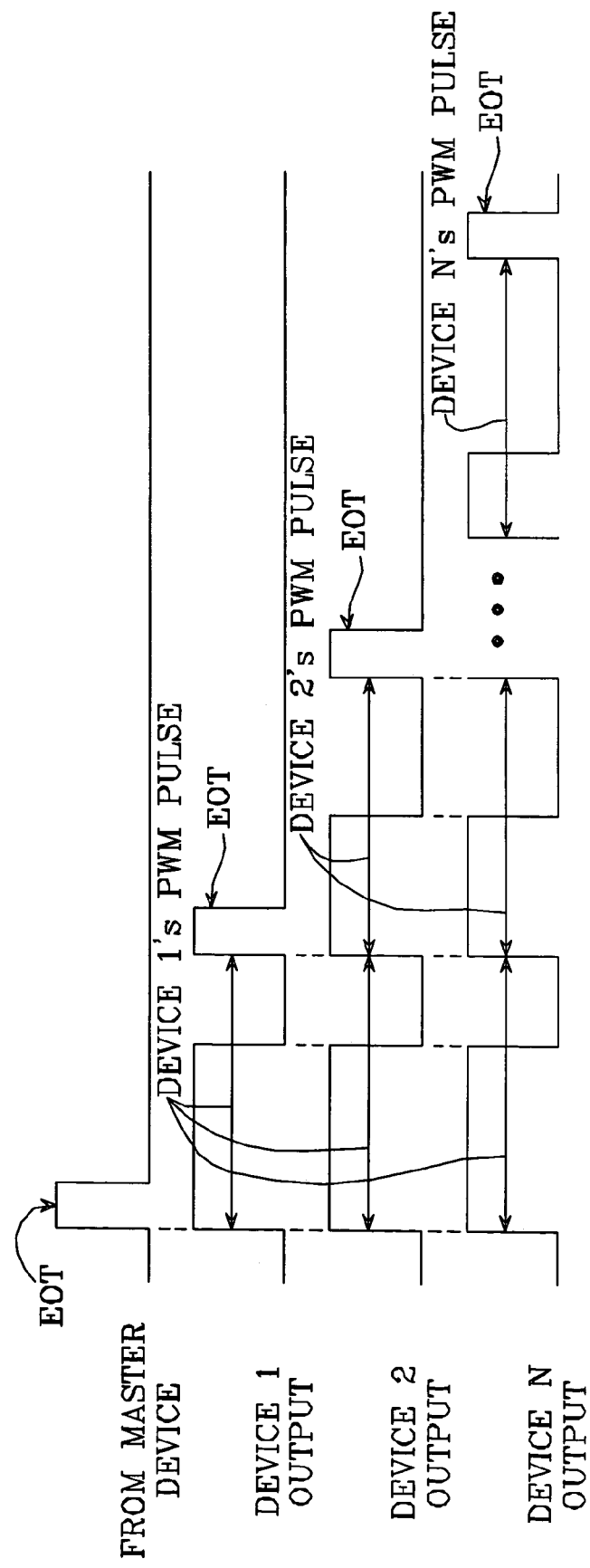
FIG. 2 is a timing diagram illustrating the operation of the system of FIG. 1.

Operation of the serial digital communication system shown in FIG. 1 is illustrated in FIG. 2. Communication is initiated when master device 10 provides an EOT signal (a single pulse in this example) at its output. The first device in the chain, DEVICE 1, buffers the EOT pulse to its output pin, but when it senses the negative edge of the EOT pulse it starts transmitting the predetermined number of PWM pulses (one pulse in this example)—and so replaces the EOT pulse with a PWM pulse. As such, DEVICE 2 receives only the PWM pulse from DEVICE 1 (and not the EOT pulse), and buffers DEVICE 1's PWM pulse to the next slave device. DEVICE 1's PWM pulse is buffered in this way through all the remaining slave devices, and is delivered to master device 10 by the last device in the chain (DEVICE N).

After DEVICE 1 transmits its PWM pulse, it sends an EOT pulse. This acts as a terminator to the PWM signal (i.e., it indicates the end of the PWM pulse's "low" time), and triggers the next device—DEVICE 2—to start transmitting its PWM pulse(s). Again, DEVICE 2 replaces the EOT pulse with its PWM pulse, which is buffered to master device 10 via the intervening slave devices.

When DEVICE 2's PWM pulse is complete, it transmits an EOT pulse which triggers DEVICE 3 to transmit its PWM pulse. Each slave device is triggered in this way until each has transmitted the predetermined number of PWM pulses.

The net result is that each slave device's PWM pulses are transmitted in one direction sequentially to the input of master device 10 via the intervening slave devices. Thus, after transmitting an EOT pulse to DEVICE 1, master device 10 receives a continuous stream of PWM pulses followed by a single EOT pulse, with the first PWM pulse received by master device 10 being that sent by DEVICE 1, followed by that sent by DEVICE 2, etc. The last PWM pulse received, originating from DEVICE N, is immediately followed by an EOT pulse. To conserve power, each slave device may be arranged to be powered down after it has finished buffering incoming PWM pulses and transmitting its own PWM pulses and the EOT pulse.

The PWM pulses can be used to represent either analog or digital values. For example, the system can be arranged such that the duty ratio of a PWM pulse is proportional to an analog value, such as an IC's temperature or a particular voltage. Alternatively, a PWM pulse can be used to represent a binary value, with one duty ratio designated as a logic "0" and another duty ratio designated as a logic "1".

The slave devices can be arranged to transmit a single PWM pulse when triggered, or a predetermined number of PWM pulses. For example, to transmit 8-bit digital words, each slave device could be arranged to transmit 8 PWM pulses, with each pulse representing one bit of the word. Thus, either analog or digital data can be encoded as PWM pulses.

As noted above, each slave device sends a predetermined number of PWM pulses when triggered to transmit. In the simplest case, each device would transmit the same number of PWM pulses. However, the number of PWM pulses transmitted does not have to be the same for each slave device—as long as the system knows in advance how many pulses are transmitted by each device.

Figure 3:
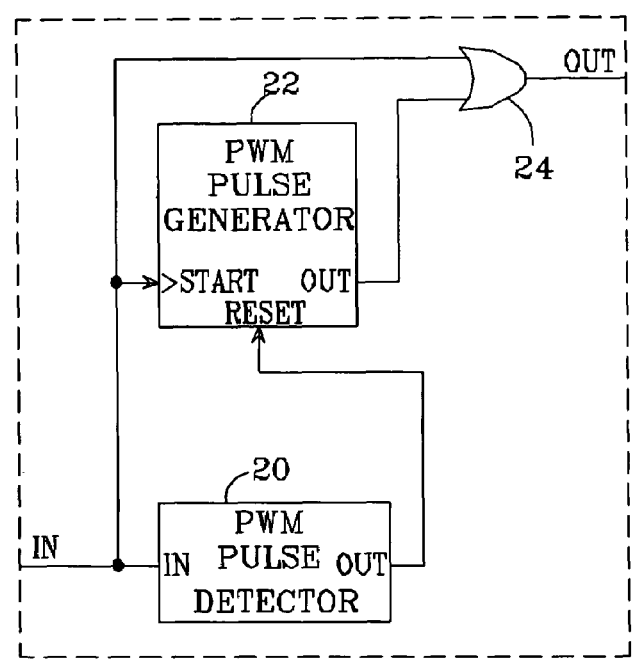
FIG. 3 is a block/schematic diagram of one possible embodiment of a slave device per the present invention.
Figure 4:
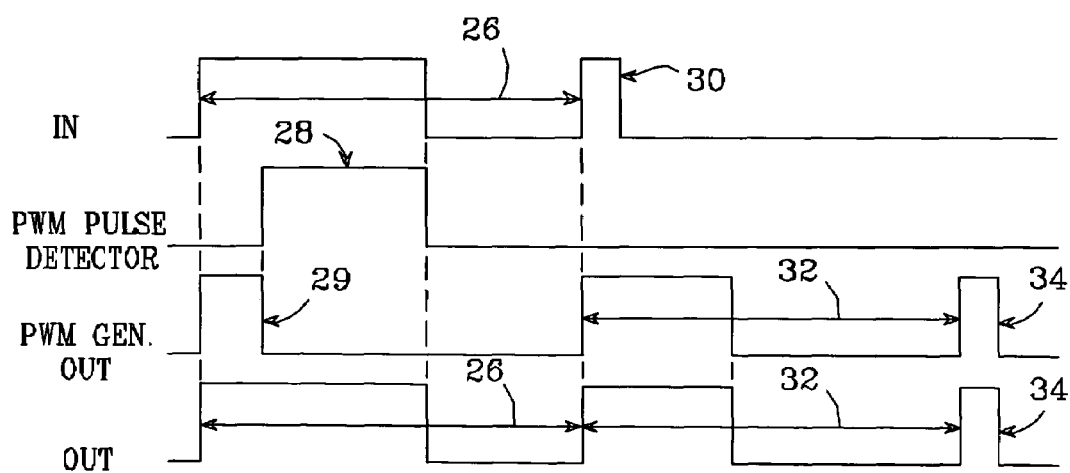
FIG. 4 is a timing diagram illustrating the operation of the slave device of FIG. 3.

One possible embodiment of a slave device per the present invention is shown in FIG. 3, with its operation illustrated with the timing diagram shown in FIG. 4. In this example, the EOT signal is a single, high-going pulse with a predefined pulse width. The device includes a PWM pulse detector 20, a PWM pulse generator 22, and a logic gate 24. A signal received at the device input (in this example, a PWM pulse 26) is applied to both PWM pulse detector 20 and PWM pulse generator 22. PWM pulse detector 20 toggles its output when the duration of the "high" portion of the incoming pulse exceeds the predefined pulse width of an EOT pulse—thereby indicating that the incoming pulse is a PWM pulse. When the detector output is high (28) (indicating that the incoming signal is a PWM pulse), the slave device is to simply buffer the incoming pulse. The detector output is connected to a reset input on PWM pulse generator 22, so that pulse generator 22 is prevented from generating its PWM pulse when the incoming signal is a PWM pulse (discussed in more detail below).

The input signal and the output of PWM pulse generator 22 are OR'd together using a logic gate 24. When PWM pulse generator 22 is inhibited, logic gate 24 passes the incoming PWM pulse on to the device output. The incoming PWM pulse is thus passively buffered to the following device in the chain.

PWM pulse generator 22 is preferably arranged to begin transmitting its PWM pulse whenever an incoming pulse is received. This is because the system does not know whether the incoming signal is a PWM pulse or an EOT signal until the predefined EOT signal width has been exceeded. Thus, PWM pulse generator 22 is arranged to assume that the incoming signal is an EOT pulse, and to begin transmitting its PWM pulse(s) on the incoming signal's positive-going edge—which it continues to do until PWM pulse detector 20 indicates that the incoming signal is a PWM pulse. This is seen in FIG. 4 with reference to pulse 29, which is the start of the PWM pulse from PWM pulse generator 22, but which is aborted when the output of PWM pulse detector 22 indicates that the incoming signal is a PWM pulse from a preceding device.

When an actual EOT pulse (30) is received, PWM pulse generator 22 begins and is permitted to continue transmitting its PWM pulse (32). This pulse is buffered to the following device in the chain via logic gate 24. After transmitting its PWM pulse, the device outputs an EOT pulse (34), which is also passed on to the following device in the chain via logic gate 24. In this way, each slave device buffers PWM pulses received from preceding devices, generates its own PWM pulses after determining that an incoming pulse is not a PWM pulse, and generates an EOT pulse after transmission of its PWM pulses is completed.

Figure 5:
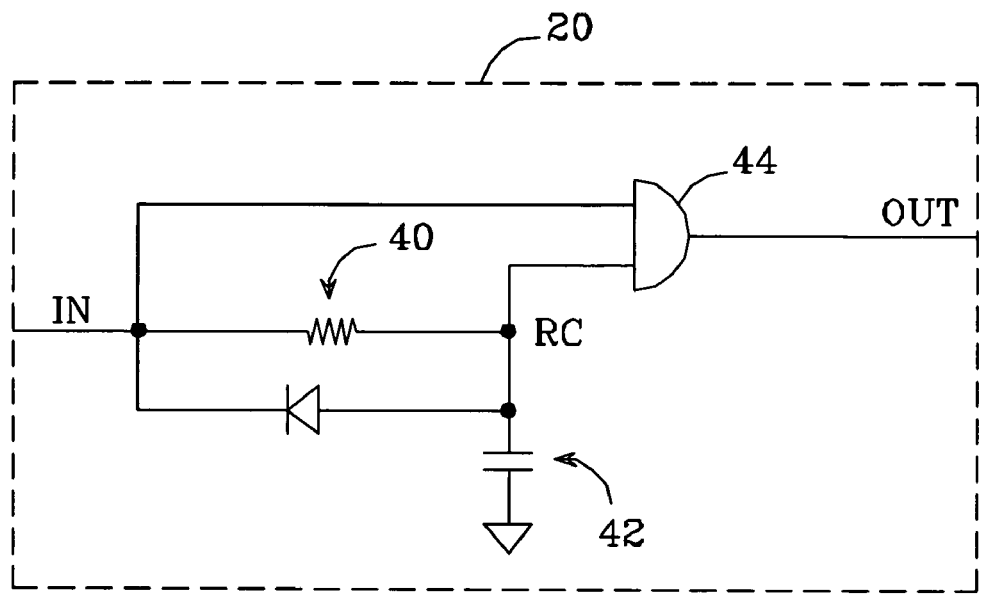
FIG. 5 is a schematic diagram of one possible embodiment of a PWM pulse detector per the present invention.
Figure 6:
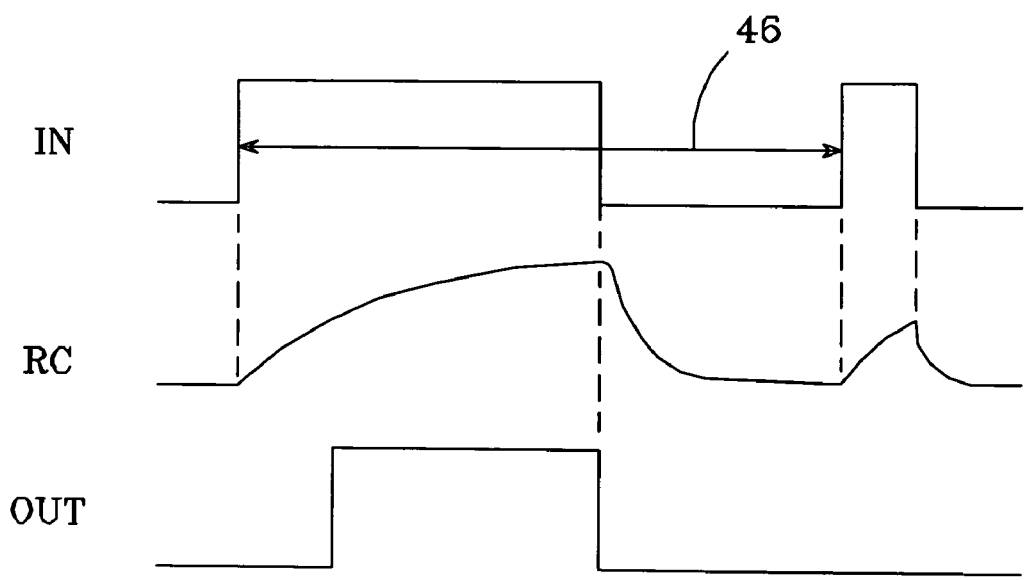
FIG. 6 is a timing diagram illustrating the operation of the PWM pulse detector of FIG. 5.

An exemplary embodiment of a PWM pulse detector 20 per the present invention is shown in FIG. 5, with its operation illustrated with the timing diagram shown in FIG. 6. The detector includes an input, which is connected to an RC network made from a resistor 40 having a resistance R and a capacitor 42 having a capacitance C; resistor 40 and capacitor 42 are connected together at a node "RC". The detector also includes a logic gate 44, the inputs of which are connected to the detector input and to node RC.

In operation, a high-going incoming pulse 46 causes node RC to increase at a rate determined by the RC network's time constant (=R*C). If the "high" portion of the incoming pulse is of sufficient duration, the voltage at node RC will increase until detected as a logic "high" by logic gate 44, thereby causing the detector's output to toggle high (and reset PWM pulse generator 22). However, the R*C time constant is set such that, if the incoming pulse is an EOT pulse, node RC will not increase to a logic "high" level, and the detector's output remains low.

Note that the slave device and PWM pulse detector implementations shown in FIGS. 3 and 5, and their corresponding timing diagrams in FIGS. 4 and 6, are merely exemplary. There are innumerable ways in which these circuits could be implemented to operate in accordance with the present serial digital communication system.

In some applications, it may be advantageous to employ a protocol which uses a "start-of-transmission" (SOT) signal in addition to an EOT signal. An SOT signal would be generated by each slave device just prior to sending its PWM pulse(s). The SOT signals would be buffered by each slave device, and would serve to separate each device's PWM pulses.

Figure 7:
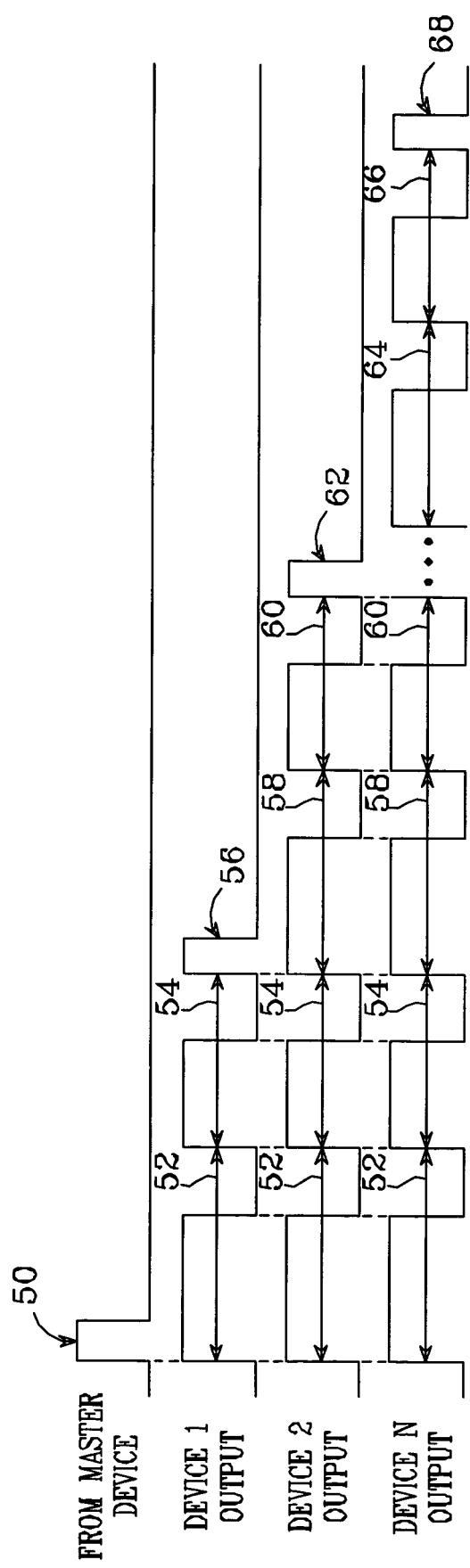
FIG. 7 is a timing diagram illustrating an alternative operating protocol for a serial digital communication system per the present invention.

Operation of the serial digital communication system shown in FIG. 1 using a SOT signal is illustrated in FIG. 7. Communication is initiated when master device 10 provides an EOT signal 50 (a single pulse in this example) at its output. DEVICE 1 responds by generating an SOT signal 52, followed by zero or more PWM pulses 54 (one in this example).

An SOT signal is preferably a pulse having a duty ratio different from that of either a PWM pulse or an EOT signal, so it may be distinguished from them by master device 10; in this example, an SOT pulse is distinguished by defining its "high" time as longer than the maximum allowed "high" time for a PWM pulse, and longer than an EOT signal. As before, DEVICE 1 transmits an EOT signal (here, a pulse 56) after sending its PWM pulse.

Upon receipt of EOT pulse 56, DEVICE 2 buffers the SOT and PWM pulse received from DEVICE 1, and then transmits its own SOT pulse 58, followed by its PWM pulse 60 and an EOT pulse 62. This sequence is repeated for each slave device in the chain. When the last slave device, DEVICE N, receives an EOT pulse from the preceding device, it sends an SOT pulse 64, followed by its PWM pulse 66 and an EOT pulse 68.

When so arranged, after initiating communications by sending an EOT pulse to DEVICE 1, master device 10 receives PWM pulses from each slave device, with each PWM pulse preceded by an SOT pulse, with a single EOT pulse at the end of the data stream.

An advantage of using a SOT signal as described above is that each slave device need not transmit a pre-determined number of PWM pulses—each device can transmit any number of PWM pulses, including no PWM pulses. The master device will know which PWM pulses come from which device because each device's PWM pulses are preceded by a SOT signal. If a slave device is to transmit no PWM pulses, it would send just a SOT signal followed by an EOT signal.

While particular embodiments of the invention have been shown and described, numerous variations and alternate embodiments will occur to those skilled in the art. Accordingly, it is intended that the invention be limited only in terms of the appended claims.

We claim:

1. A serial digital communication system, comprising:
   a master device having an input and an output; and
   a plurality of slave devices connected serially between said master device's output and input thereby forming a closed chain;
   each of said slave devices arranged to transmit a predetermined number of pulse-width-modulated (PWM) pulses to the device immediately following it in the chain upon receipt of an end-of-transmission (EOT) signal from the device immediately preceding it in the chain, and to transmit an EOT signal when the transmission of said predetermined number of PWM pulses is completed;
   said master device arranged to transmit an EOT signal to initiate said transmission of PWM pulses;
   each of said slave devices further arranged to passively buffer PWM pulses received from the slave device immediately preceding it in the chain such that each device's PWM pulses are transmitted in one direction sequentially to the input of said master device via the intervening slave devices, such that, upon transmitting said EOT signal, said master device receives a continuous stream of PWM pulses followed by a single EOT signal.

2. The system of claim 1, wherein said EOT signal comprises one or more pulses having characteristics which are clearly distinguishable from those of said PWM pulses.

3. The system of claim 2, wherein said EOT signal comprises a single high-going pulse which has a predetermined pulse width, and said PWM pulses have a minimum pulse "high" time which is greater than said predetermined pulse width.

4. The system of claim 1, wherein said predetermined number of PWM pulses is one.

5. The system of claim 1, wherein each slave device transmits an equal number of PWM pulses upon receipt of an EOT pulse.

6. The system of claim 1, wherein each slave device transmits a respective number of PWM pulses upon receipt of an EOT pulse, wherein said respective numbers need not be equal.

7. The system of claim 1, wherein said system is arranged such that each of said slave devices is powered down after transmitting an EOT pulse.

8. The system of claim 1, wherein said EOT signal comprises a single high-going pulse which has a predetermined pulse width, and said PWM pulses have a minimum pulse "high" time which is greater than said predetermined pulse width, each of said slave devices comprising:
   an input for connection to the output of the device immediately preceding it in the chain and an output for connection to the input of the device immediately following it in the chain;
   a PWM pulse detector connected to said slave device input which detects when an incoming high-going pulse has a "high" time greater than said minimum pulse "high" time;
   a PWM pulse generator arranged to generate said predetermined number of PWM pulses at an output upon receipt of a high-going pulse at said slave device input and to immediately terminate said generation of said PWM pulses if said PWM pulse detector detects that an incoming high-going pulse has a "high" time greater than said minimum pulse "high" time; and
   a logic gate connected to said device input and to said PWM pulse generator output at respective inputs and which produces a high-going output when either of said logic gate inputs goes high;

such that said slave device passively buffers PWM pulses received from the device immediately preceding it in the chain to said slave device output and generates said predetermined number of PWM pulses at said PWM pulse generator output and said slave device output when said PWM pulse detector detects that an incoming high-going pulse has a "high" time less than said minimum pulse "high" time.

9. The system of claim 8, wherein said PWM pulse detector comprises:
an input coupled to said device input;
an output coupled to said PWM pulse generator;
an RC network connected to said PWM pulse detector input and produces an output which increases at a rate that varies with the resistance and capacitance values of said RC network upon receipt of a high-going pulse at said PWM pulse detector input; and
a logic gate connected to said PWM pulse detector input and said RC network output and which produces a high-going output when both of said logic gate inputs are high.

10. The system of claim 1, wherein the duty ratios of said PWM pulses represent respective analog values.

11. The system of claim 1, wherein said analog values represent temperatures.

12. The system of claim 1, wherein the duty ratios of said PWM pulses represent respective binary values.

13. The system of claim 1, wherein each of said slave devices is further arranged to transmit a start-of-transmission (SOT) signal immediately prior to transmitting said predetermined number of pulse-width-modulated (PWM) pulses, to transmit said EOT pulse when the transmission of said SOT signal and said predetermined number of PWM pulses is completed, and to passively buffer the SOT signals and the PWM pulses received from the immediately preceding slave device such that each device's SOT signal and PWM pulses are transmitted in one direction sequentially to the input of said master device via the intervening slave devices, such that, upon transmitting said EOT pulse, said master device receives said predetermined number of PWM pulses from each slave device with each set of PWM pulses preceded by a SOT signal, followed by a single EOT signal.

14. The system of claim 13, wherein said EOT signal comprises a single high-going pulse which has a predetermined pulse width, said PWM pulses have a minimum pulse "high" time which is greater than said predetermined pulse width and a maximum pulse "high" time, and said SOT signal comprises a pulse having a pulse "high" time greater than said maximum pulse "high" time.

15. A serial digital communication system, comprising:
a master device having an input and an output; and
a plurality of slave devices connected serially between said master device's output and input thereby forming a closed chain;
each of said slave devices arranged to transmit a start-of-transmission (SOT) signal followed by zero or more pulse-width-modulated (PWM) pulses to the device immediately following it in the chain upon receipt of an end-of-transmission (EOT) signal from the device immediately preceding it in the chain, and to transmit an EOT signal when the transmission of said SOT signal and said PWM pulses is completed;
said master device arranged to transmit a EOT signal to initiate said transmission of SOT signals and PWM pulses;
each of said slave devices further arranged to passively buffer the SOT signals and the PWM pulses received from the immediately preceding slave device such that each device's SOT signal and PWM pulses are transmitted in one direction sequentially to the input of said master device via the intervening slave devices, such that, upon transmitting said EOT signal, said master device receives said PWM pulses from each slave device with each device's PWM pulses preceded by a SOT signal, followed by a single EOT signal.

16. The system of claim 15, wherein said EOT signal comprises a single high-going pulse which has a predetermined pulse width, said PWM pulses have a minimum pulse "high" time which is greater than said predetermined pulse width and a maximum pulse "high" time, and said SOT signal comprises a pulse having a pulse "high" time greater than said maximum pulse "high" time.

17. A method of transferring data from a plurality of slave devices connected serially in a closed chain between a master device's output and input, comprising:
configuring each of said slave devices to transmit respective data to the device immediately following it in the chain upon receipt of an end-of-transmission (EOT) signal from the device immediately preceding it in the chain, and to transmit an EOT signal when the transmission of said data is completed;
transmitting an EOT signal to the first slave device in said chain to initiate said transmission of data;
passively buffering data received from an immediately preceding slave device such that each slave device's data is transmitted in one direction sequentially to the input of said master device via the intervening slave devices, such that, upon transmitting said EOT pulse, said master device receives a continuous stream of data followed by a single EOT signal.

18. The method of claim 17, wherein said respective data is a predetermined number of pulse-width-modulated (PWM) pulses.

19. The method of claim 18, wherein said EOT signal comprises a single high-going pulse which has a predetermined pulse width, and said PWM pulses have a minimum pulse "high" time which is greater than said predetermined pulse width.

20. The method of claim 18, further comprising encoding analog values as respective PWM pulses.

21. The method of claim 18, further comprising encoding binary values as respective PWM pulses.

22. The method of claim 17, further comprising powering down a slave device after it transmits said EOT signal.

* * * * *